(12) United States Patent
Iverson et al.

(10) Patent No.: US 6,883,848 B1
(45) Date of Patent: Apr. 26, 2005

(54) PICKUP TRUCK BED FRAME AND PICKUP TRUCK HAVING A BED FRAME

(75) Inventors: Robert A. Iverson, Eden Prairie, MN (US); Rodney L. Bridges, Lilburn, GA (US)

(73) Assignee: Lund International, Inc., Anoka, MN (US)

( * ) Notice: Subject to any disclaimer, the term of this patent is extended or adjusted under 35 U.S.C. 154(b) by 8 days.

(21) Appl. No.: 10/698,853

(22) Filed: Oct. 31, 2003

(51) Int. Cl.$^7$ .............................................. B60R 21/13
(52) U.S. Cl. ...................... 296/3; 296/180.1; 296/37.6; 296/1.07; 280/756
(58) Field of Search ...................... 296/3, 180.1, 181.5, 296/37.6, 1.04, 1.07; 280/756

(56) References Cited

U.S. PATENT DOCUMENTS

| | | |
|---|---|---|
| 4,343,506 A | 8/1982 | Saltzman |
| 4,408,792 A | 10/1983 | Sullivan |
| 4,640,541 A | 2/1987 | FitzGerald et al. |
| 4,741,569 A | 5/1988 | Sutphen |
| 4,915,441 A | 4/1990 | Nitzke |
| 4,925,235 A | 5/1990 | Fingerle |
| 4,931,809 A | 6/1990 | Putman et al. |

(Continued)

FOREIGN PATENT DOCUMENTS

EP          0413099 A1  *  6/1990

*Primary Examiner*—Jason Morrow
(74) *Attorney, Agent, or Firm*—Merchant & Gould P.C.

(57) ABSTRACT

A pickup truck bed frame is described that includes a frame member, a left support structure, and a right support structure. The frame member includes a frame member left end constructed for attachment to a pickup truck bed left sidewall, a frame member right end constructed for attachment to a pickup truck bed right sidewall, and a central member constructed to extend across a pickup truck cab from the frame member left end to the frame member right end. The left support structure includes a left support arm having a left support arm first end constructed for attachment to the frame member, and a left support arm second end constructed for attachment to a pickup truck bed left sidewall. The right support structure includes a right support arm having a right support arm first end constructed for attachment to the frame member, and a right support arm second end constructed for attachment to a pickup truck bed right sidewall. The left support structure can include a left bed rail having a left bed rail first end constructed for attachment to the left support arm, and a left bed rail second end constructed for attachment to a pickup truck bed left sidewall. The right support structure can include a right bed rail having a right bed rail first end constructed for attachment to the right support arm, and a right bed rail second end constructed for attachment to a pickup truck bed right sidewall. In general, the left bed rail and the right bed rail can extend along the left sidewall and the right sidewall of a pickup truck bed. The frame member and the left and right support structures, including the left and right bed rails, provide a surface for which to attach tie down materials for holding articles in place in a pickup truck bed during transportation. A pickup truck that includes the pickup truck bed frame is described.

17 Claims, 9 Drawing Sheets

U.S. PATENT DOCUMENTS

| | | |
|---|---|---|
| 4,932,716 A | 6/1990 | Marlowe et al. |
| 4,957,322 A | 9/1990 | Marlowe et al. |
| 4,991,906 A | 2/1991 | Fingerle |
| 5,018,779 A | 5/1991 | Lund |
| 5,054,799 A | 10/1991 | Fingerle |
| 5,061,000 A * | 10/1991 | Haugen et al. ................ 296/3 |
| 5,258,893 A * | 11/1993 | Finneyfrock ............... 280/748 |
| 5,458,392 A | 10/1995 | Chen et al. |
| 5,882,058 A * | 3/1999 | Karrer ...................... 296/39.2 |
| 5,947,520 A | 9/1999 | McHorse |
| 6,126,229 A | 10/2000 | Lund |
| 6,186,571 B1 * | 2/2001 | Burke .......................... 296/3 |
| 6,267,434 B1 | 7/2001 | Casillas |
| D490,356 S * | 5/2004 | Ratajczek .................. D12/222 |

* cited by examiner

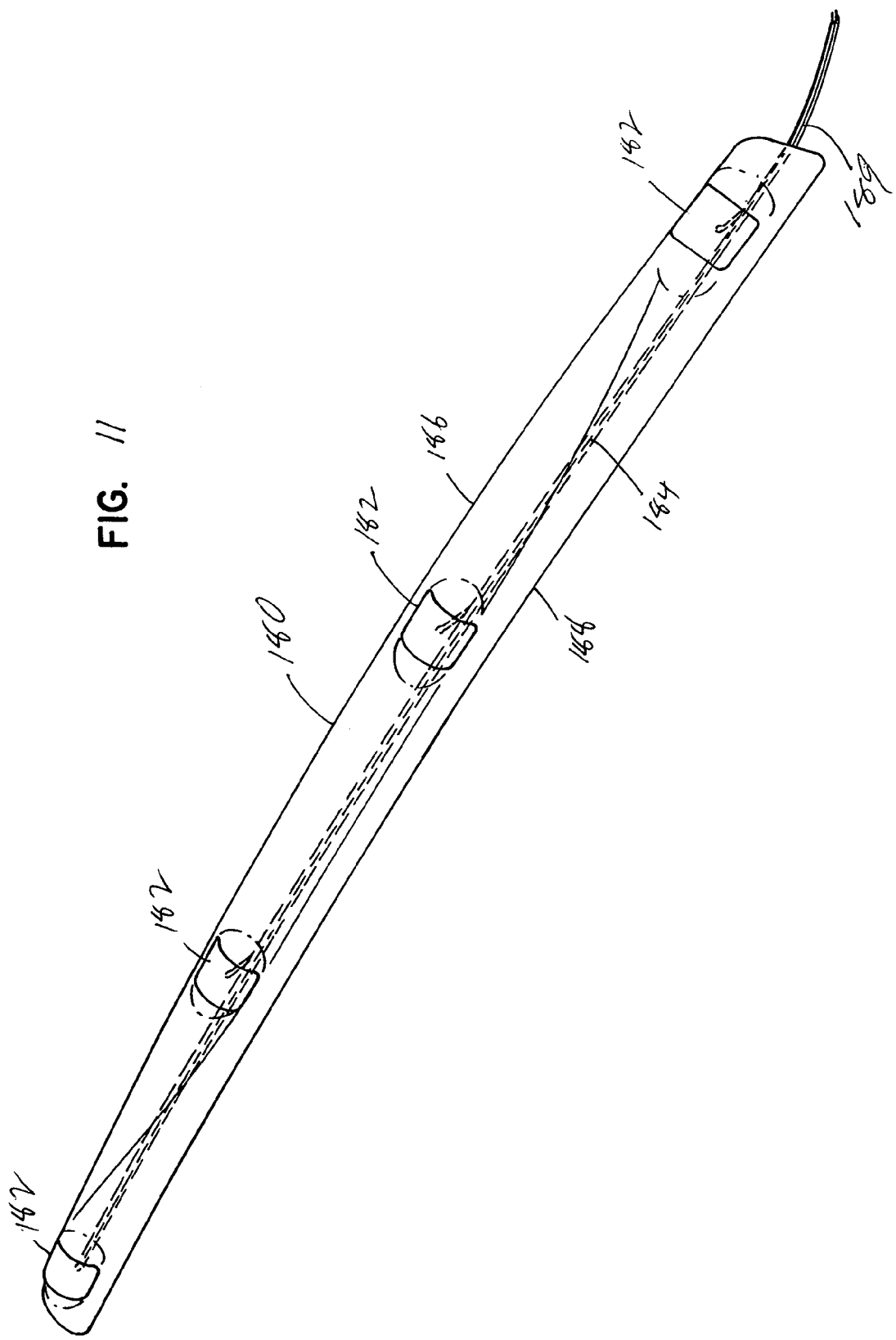

PICKUP TRUCK BED FRAME AND PICKUP TRUCK HAVING A BED FRAME

FIELD OF THE INVENTION

The invention relates to a pickup truck bed frame and to a pickup truck having a bed frame. In particular, the pickup truck bed frame attaches to the sidewalls of a pickup truck bed and is available to assist with cargo management within the pickup truck bed.

BACKGROUND OF THE INVENTION

Cab fairings are often provided either extending from the rear of a pickup truck cab or from the sidewalls of a pickup truck bed. In general, cab fairings are often provided for decreasing the drag effect of airflow over the cab and also for aesthetic appeal. Exemplary cab fairings are described in U.S. Pat. No. 6,126,229 to Lund, U.S. Pat. No. 5,018,779 to Lund, U.S. Design Pat. No. 281,487 to Chapman, U.S. Design Pat. No. 286,143 to Lund, U.S. Design Pat. No. 294,242 to O'Neill, and U.S. Design Pat. No. 295,084 to Weber.

Items placed within a pickup truck often have a tendency to move around or shift as the pickup truck is driven. There are techniques used to hold items in the bed of a pickup truck and prevent movement or shifting. Items are often tied down if there is something to which the item can be secured.

SUMMARY OF THE INVENTION

A pickup truck bed frame is provided according to the invention. The pickup truck bed frame includes a frame member, a left support structure, and a right support structure. The frame member includes a frame member left end constructed for attachment to a pickup truck bed left sidewall, a frame member right end constructed for attachment to a pickup truck bed right sidewall, and a central member constructed to extend across a pickup truck cab from the frame member left end to the frame member right end. The left support structure includes a left support arm having a left support arm first end constructed for attachment to the frame member, and a left support arm second end constructed for attachment to a pickup truck left sidewall. The right support structure includes a right support arm having a right support arm first end constructed for attachment to the frame member, and a right support arm second end constructed for attachment to a pickup truck bed right sidewall. The left support structure can include a left bed rail having a left bed rail first end constructed for attachment to the left support arm, and a left bed rail second end constructed for attachment to a pickup truck bed left sidewall. The right support structure can include a right bed rail having a right bed rail first end constructed for attachment to the right support arm, and a right bed rail second end constructed for attachment to a pickup truck bed right sidewall. In general, the left bed rail and the right bed rail can extend along the left sidewall and the right sidewall of a pickup truck bed. The frame member and the left and right support structures, including the left and right bed rails, provide a surface for which to attach tie down materials for holding articles in place in a pickup truck bed during transportation.

The pickup truck bed frame can include a left panel attached to the frame member and the left support arm, and a right panel attached to the frame member and the right support arm. The left panel and the right panel can be adhered in place, and can be provided for aesthetic appeal. In addition, a contoured member can be attached to the central member by, for example, adhesive tape. In addition, the contoured member can include lights.

A pickup truck is provided according to the invention. The pickup truck includes a cab, a bed having a left sidewall and a right sidewall, and a pickup truck bed frame attached to the left sidewall and the right sidewall. The pickup truck bed frame includes a frame member, a left support structure, and a right support structure.

BRIEF DESCRIPTION OF THE DRAWINGS

FIG. 11 is a perspective view of alternative central member according to the principles of the invention.

DETAILED DESCRIPTION OF THE PREFERRED EMBODIMENT

Figure 1:
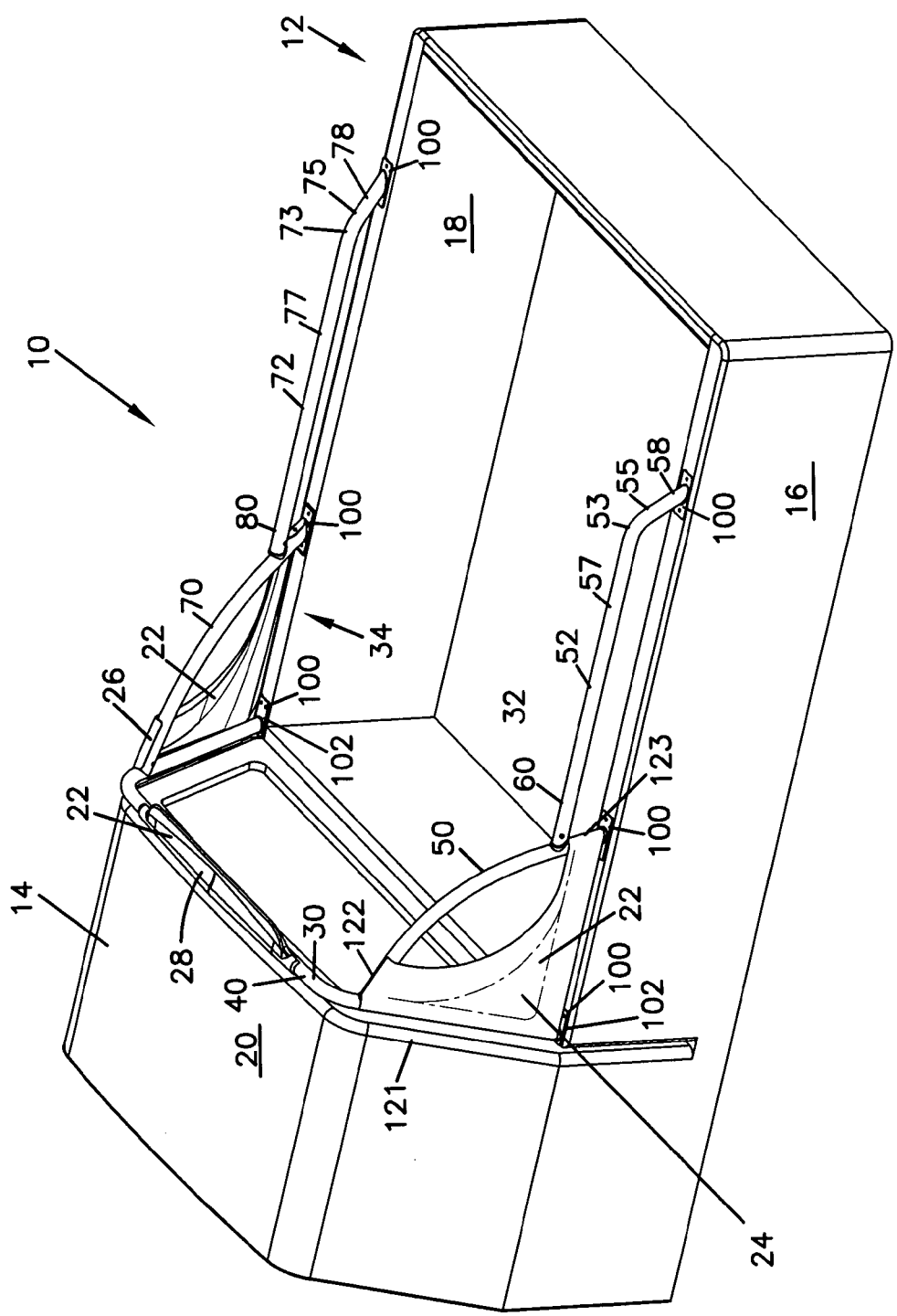
FIG. 1 is a perspective view of a pickup truck having a pickup truck bed frame attached thereto according to the principles of the invention.
Figure 2:
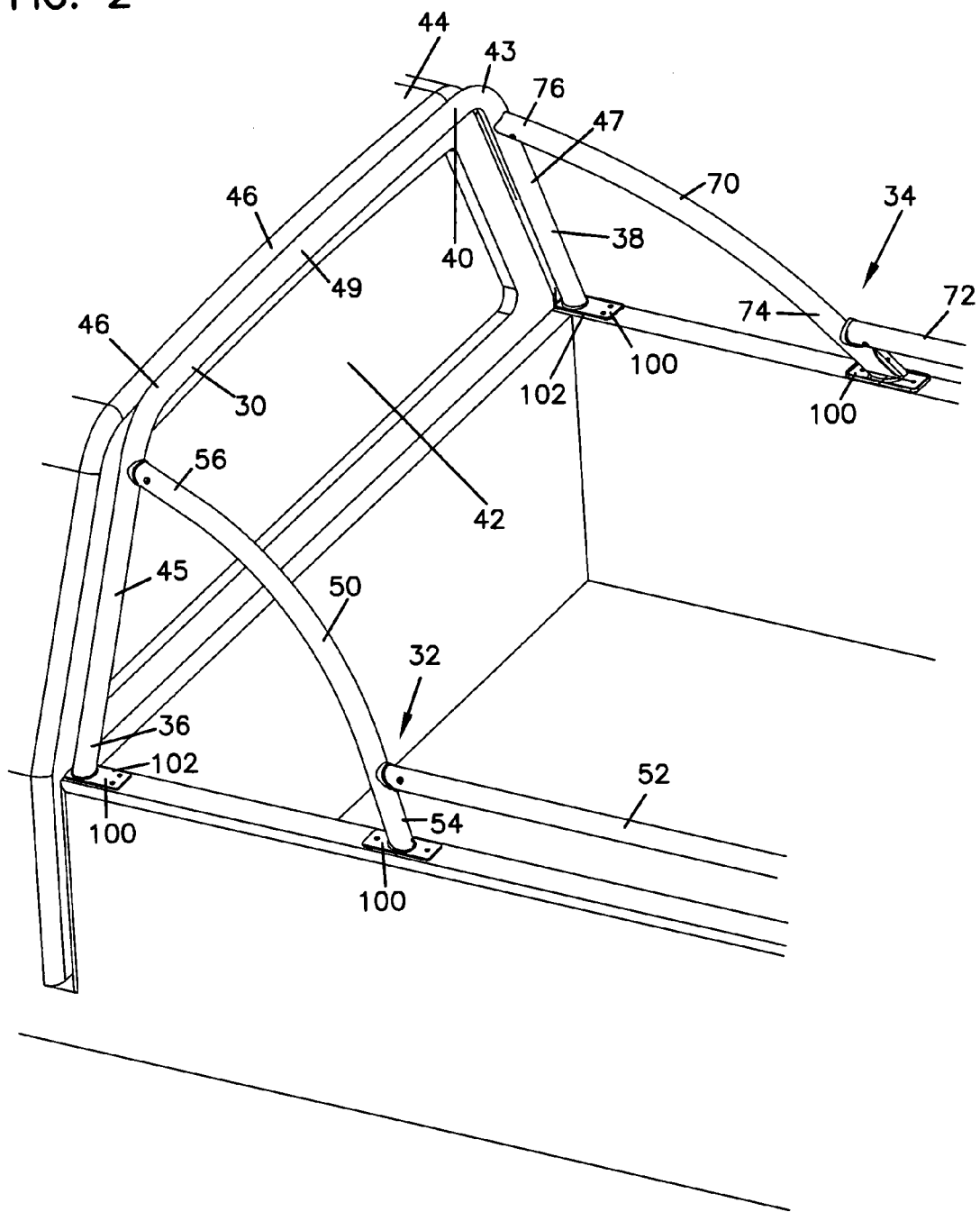
FIG. 2 is a perspective view of a portion of the pickup truck and pickup truck bed frame shown in FIG. 1.

Referring to FIG. 1, a pickup truck bed frame according to the invention is shown at reference number 10. The pickup truck bed frame is shown attached to the bed 12 of a pickup truck 14. The bed 12 includes a left sidewall 16 and a right sidewall 18. In general, the designation "left" and "right" as used herein refers to the orientation based upon a driver sitting within the cab 20.

The pickup truck bed frame 10 is shown in FIGS. 1–6 in various stages of assembly with various accessories 22 that may or may not be provided on the pickup truck bed frame 10 as desired by the individual owner of the pickup truck bed frame 10. Exemplary accessories 22 include the left side panel 24, the right side panel 26, and the contoured member 28. In general, it should be understood that the owner may or may not decide to use any of the accessories 22 and may or may not choose to incorporate additional accessories. In addition, it should be understood that many of the accessories 22 can be removed to provide additional surface area for which to attach tie down materials. Exemplary tie down materials include bungee cords, ropes, straps, and clamps. Tie down materials can be attached to the pickup truck bed frame 10 in order to hold items in place in the bed 12. A clamp fastener that can be used with the pickup truck bed frame according to the invention is described in U.S. application Ser. No. 10/698,852 that was filed with the United States Patent and Trademark Office on Oct. 31, 2003, the entire disclosure of which is incorporated herein by reference. The ability to hold items in place in a pickup truck bed can be referred to as "cargo management." The pickup truck bed frame according to the invention helps assist in cargo management by providing structure to which tie down items can be attached.

The pickup truck bed frame 10 includes a frame member 30, a left support structure 32, and a right support structure 34. The frame member 30 includes a frame member left end 36, a frame member right end 38, and a frame member central portion 40. The frame member 30 is generally constructed to extend across the rear of the cab 20 from the left sidewall 16 to the right sidewall 18. In addition, the frame member 30 should be provided at a height sufficient to minimize obstruction through the cab rear window 42 and should not extend too high above the cab roof 44 in order to minimize wind resistance. The frame member 30 includes a surface 46 upon which the contoured member 28 can attach.

The frame member 30 includes a left bend 41 and a right bend 43 so that the frame member generally follows the outline of the cab 20. It should be understood that the central member 30 can be provided as a single structure such as a tube or pipe. Alternatively, the frame member can be provided in parts that can be assembled or disassembled. The frame member can be considered as having a left frame member arm 45 that extends from the frame member left end 36 to the left bend 41, a right frame member arm 47 that extends from the frame member right end 38 to the right bend 43, and a frame member extension 49 that extends between the left bend 41 and the right bend 43. It should be understood that the left frame member arm 45, the right frame member arm 47, and the frame member extension 49 can be provided as one continuous piece or it can be provided as a plurality of separate pieces that can be attached together.

Because many pickup truck cabs have a slight curve across the cab roof 44, it can be desirable to have the frame member extension 49 follow the curve of the cab roof 44. Accordingly, the frame member extension 49 can be curved but it has been found that providing a gentle curve in the frame member extension 49 can be relatively expensive. Instead, the frame member extension 49 can be provided as an essentially straight member without a curve or the frame member extension 49 can be provided so that it has a slight bend in its center to create a peak at the center. Whether the frame member extension is straight or peaked, the contoured member 28 can be attached to it to help create the look of a gentle curve.

The left support structure 32 includes a left arm 50 and a left bed rail 52. The left arm 50 includes a left arm lower end 54 and a left arm upper end 56. The left arm end lower 54 is constructed for attachment to the left sidewall 16. The left arm upper end 56 is constructed for attachment to the frame member 30, and can be attached below the left bend 41. The left bed rail 52 includes a left bed rail lower end 58 and a left bed rail upper end 60. The left bed rail lower end 58 is constructed for attachment to the left sidewall 16. The left bed rail upper end 60 is constructed for attachment to the left arm 50.

The right support structure 34 includes a right arm 70 and a right bed rail 72. The right arm 70 includes a right arm lower end 74 and a right arm upper end 76. The right arm end 74 is constructed for attachment to the right sidewall 18. The right arm upper end 76 is constructed for attachment to the frame member 30, and can be attached below the right bend 43. The right bed rail 72 includes a right bed rail lower end 78 and right bed rail upper end 80. The right bed rail lower end 78 is constructed for attachment to the right sidewall 18. The right bed rail upper end 80 is constructed for attachment to the right arm 70.

It should be understood that the left bed rail 52 and the right bed rail 72 can be considered optional. That is, the left support structure 32 and the right support structure 34 can be provided with or without the left bed rail 52 and/or the right bed rail 72. The left bed rail 52 and the right bed rail 72 are useful for enhancing cargo management. That is, the left bed rail 52 and the right bed rail 72 can be used for tying rope, line, straps, bungee cords, etc. thereto or to clamp fasteners provided thereon to hold items in place in the pickup truck bed during transport.

The left bed rail 52 and the right bed rail 72 are constructed so that they extend along the left sidewall and the right sidewall of a pickup truck bed. The left bed rail 52 and the right bed rail 72 include bed rail bends 53 and 73, respectively, that separate riser portions 55 and 75 and extension portions 57 and 77. The height of the riser portions 55 and 75 are provided so that the extension portions 57 and 77 are provided at a desired height above the sidewalls 16 and 18.

Figure 4:
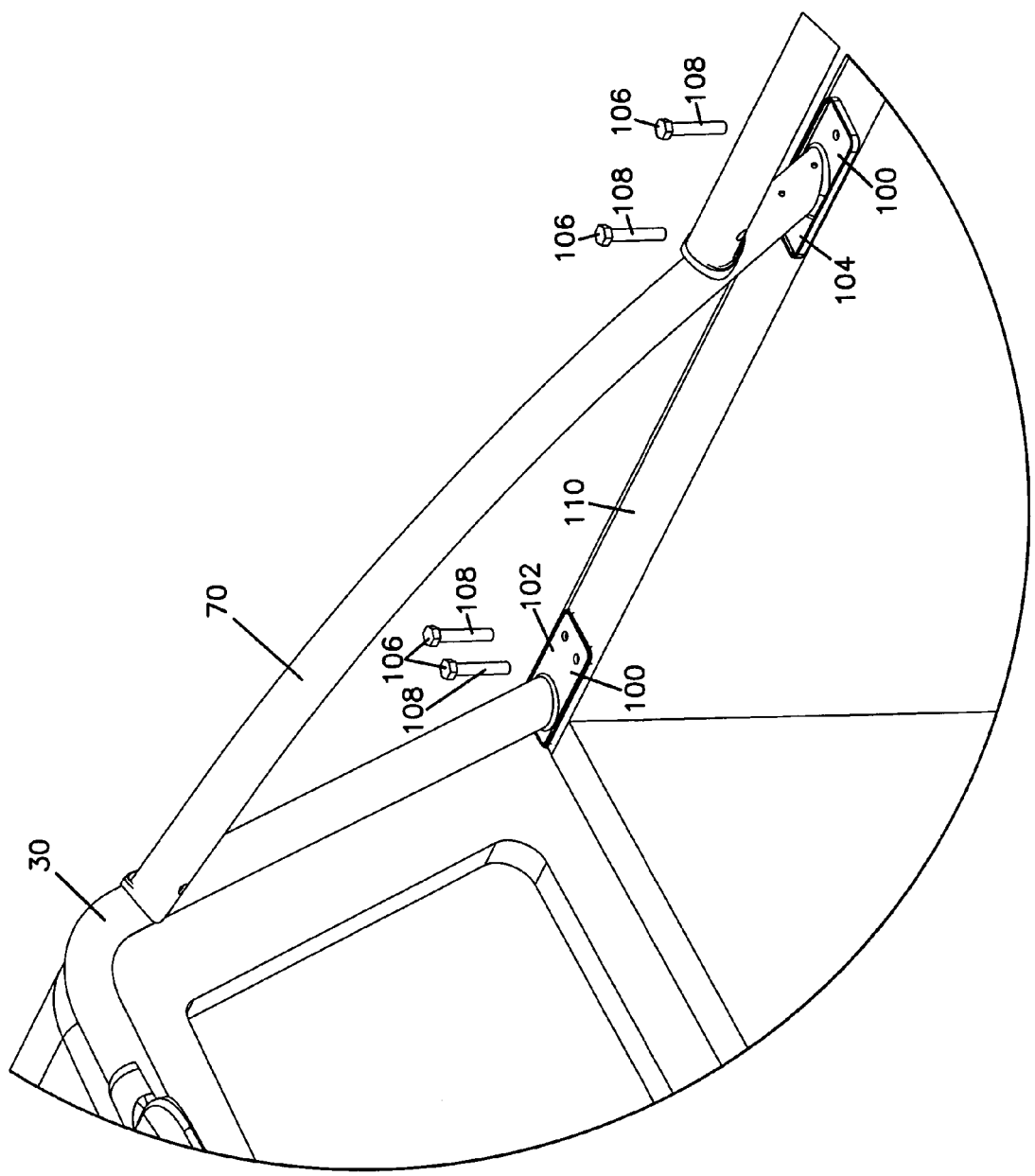
FIG. 4 is a perspective view of a partially assembled portion of the pickup truck and pickup truck bed frame shown in FIG. 1.

Attachment plates 100 can be provided as part of the pickup truck bed frame 10 to allow for attachment to the pickup truck bed 12. Two types of attachment plates 100 can be provided. The first attachment plates 102 attach to the frame member left end 36 and the frame member right end 38 and allow the frame member 30 to extend relatively closely along the cab 20. The second attachment plates 104 can be provided attached to the left arm lower end 54, the right arm lower end 74, the left bed rail lower end 58, and the right bed rail lower end 78. The attachment can be provided by welding, soldering, adhesive, or other type of fastening arrangement. As shown in FIG. 4, the first attachment plate 102 and the second attachment plate 104 provide for attachment to the sidewalls by using fasteners 106. The fasteners 106 can be provided as bolts 108 that extend through the attachment plates 100 and the sidewall top surface 110. Additional types of fasteners that can be used include screws and rivets.

Figure 3:
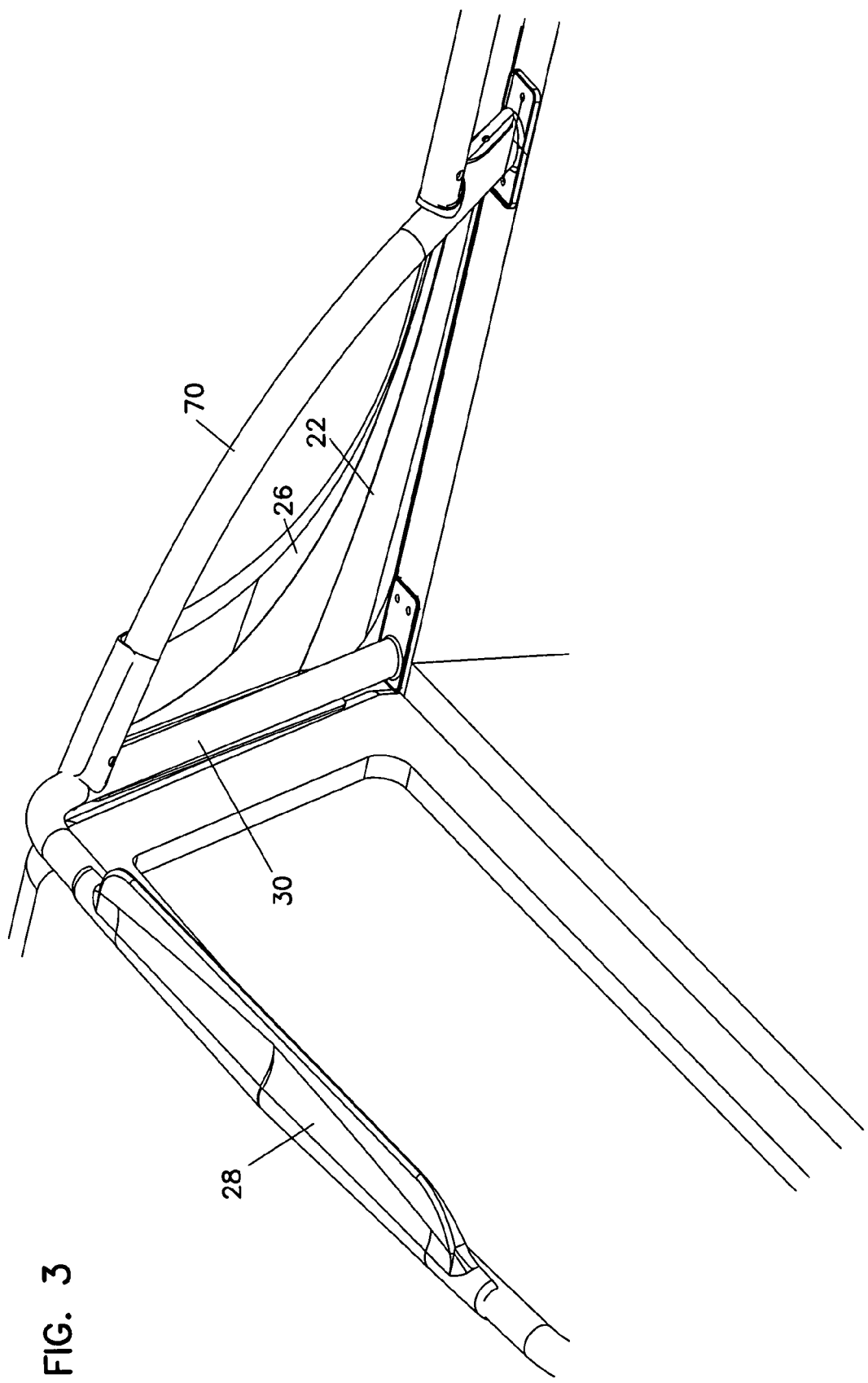
FIG. 3 is a perspective view of a portion of the pickup truck and pickup truck bed frame shown in FIG. 1.
Figure 6:
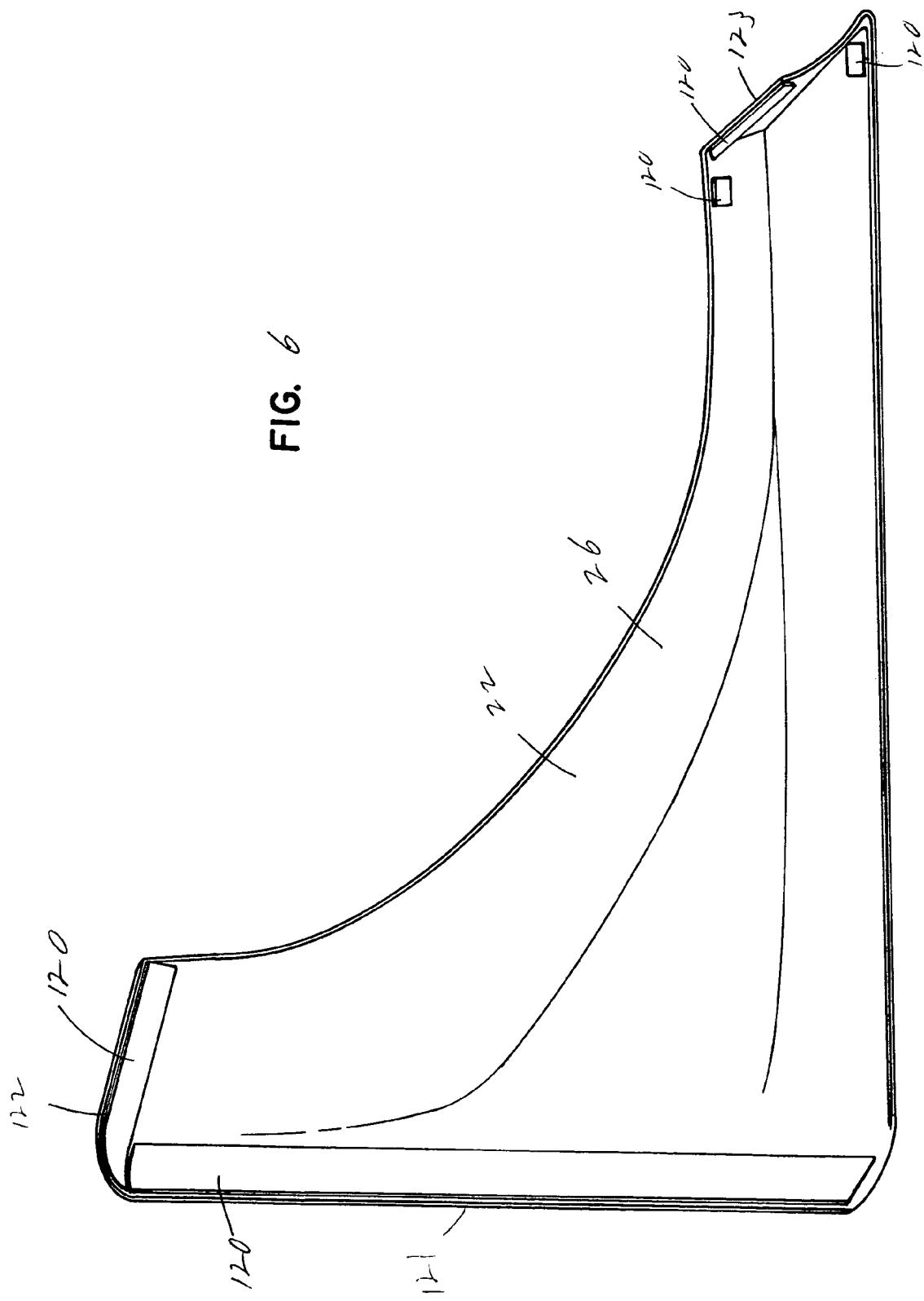
FIG. 6 is a side view of the right side panel of the pickup truck bed frame shown in FIG. 1.
Figure 7:
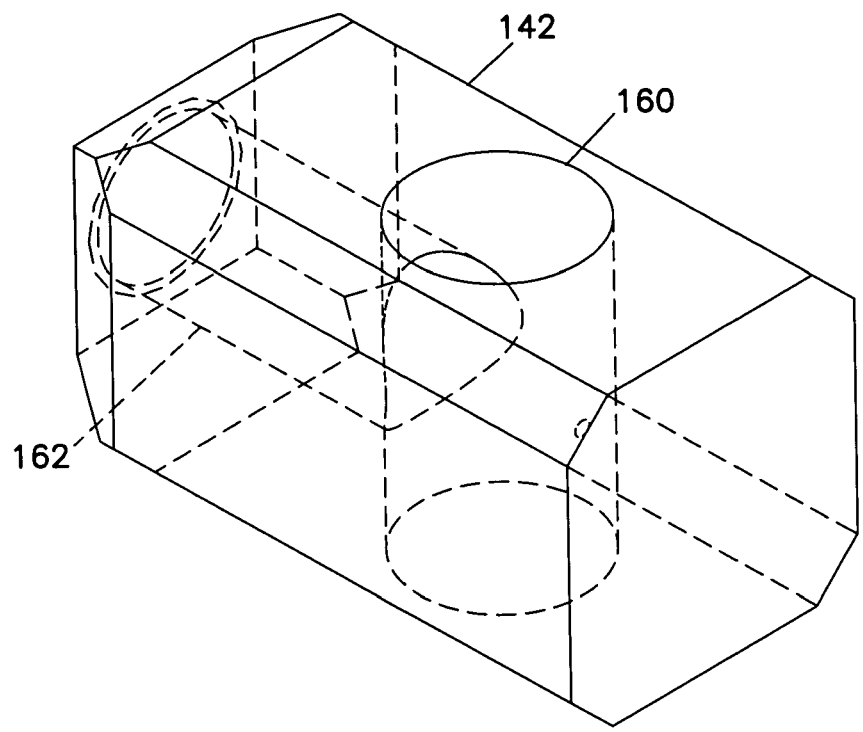
FIG. 7 is a perspective view of the insert shown in FIG. 5.
Figure 8:
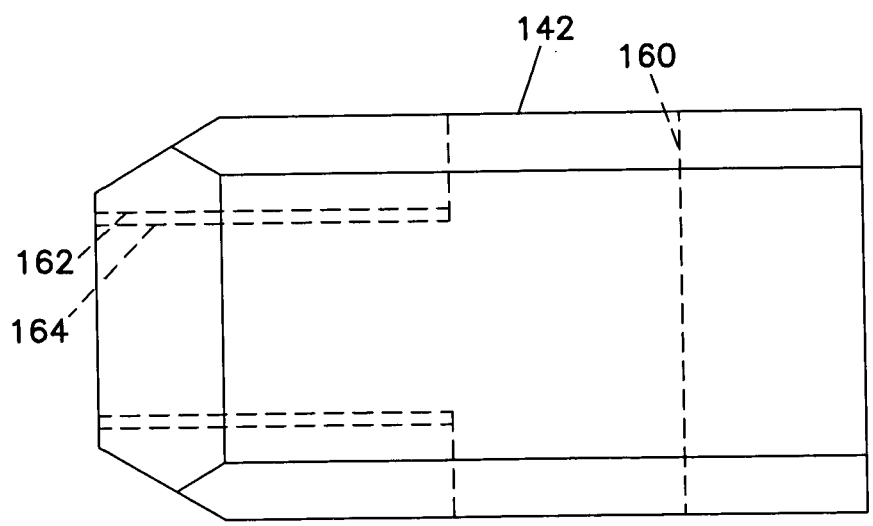
FIG. 8 is a side view of the insert shown in FIG. 5.
Figure 9:
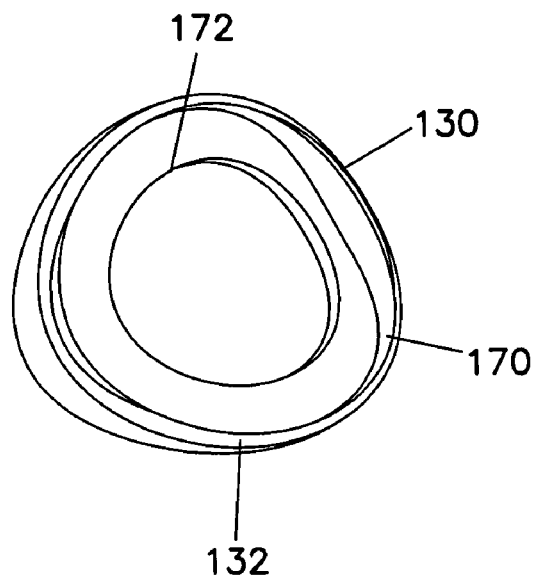
FIG. 9 is an end view of the seat shown in FIG. 5.
Figure 10:
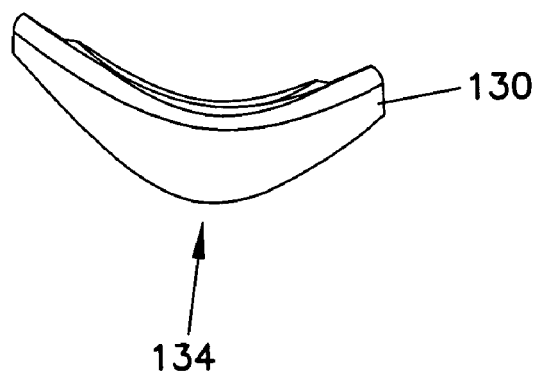
FIG. 10 is a side view of the seat shown in FIG. 5.

The right side panel 26 is shown attached in FIG. 3 and unattached in FIG. 6. The right side panel 26 can be attached to the frame member 30 and the right arm 70 by adhesive tape 120. The adhesive tape 120 can be provided at the various locations where the right panel 26 will contact the frame member 30 and the right arm 70. It should be understood that the left panel 24 can be attached similarly to the frame member 30 and the left arm 50. It should be understood that the left panel 24 and the right panel 26 can generally be provided for aesthetics. That is, they allow the pickup truck bed frame 10 to look more like a cab faring, or simply provide a desirable styling. The left panel 24 and the right panel 26 include a forward attachment edge 121 that generally wraps around the frame member 30 and allows the adhesive tape to contact the frame member 30. In addition, the left panel 24 and the right panel 26 include a top edge 122 and a rear edge 123 that allow the panels to wrap the left arm 50 and/or the right arm 70 so that the adhesive tape 120 can contact the left arm 50 and/or the right arm 70. The contoured member 28 can similarly include adhesive tape to provide for attachment to the frame member 30. Different types of attachment can be provided in place of adhesive tape. For example, the accessories 22 can be attached by adhesive or mechanical fasteners such as screws, bolts, or rivets.

Figure 5:
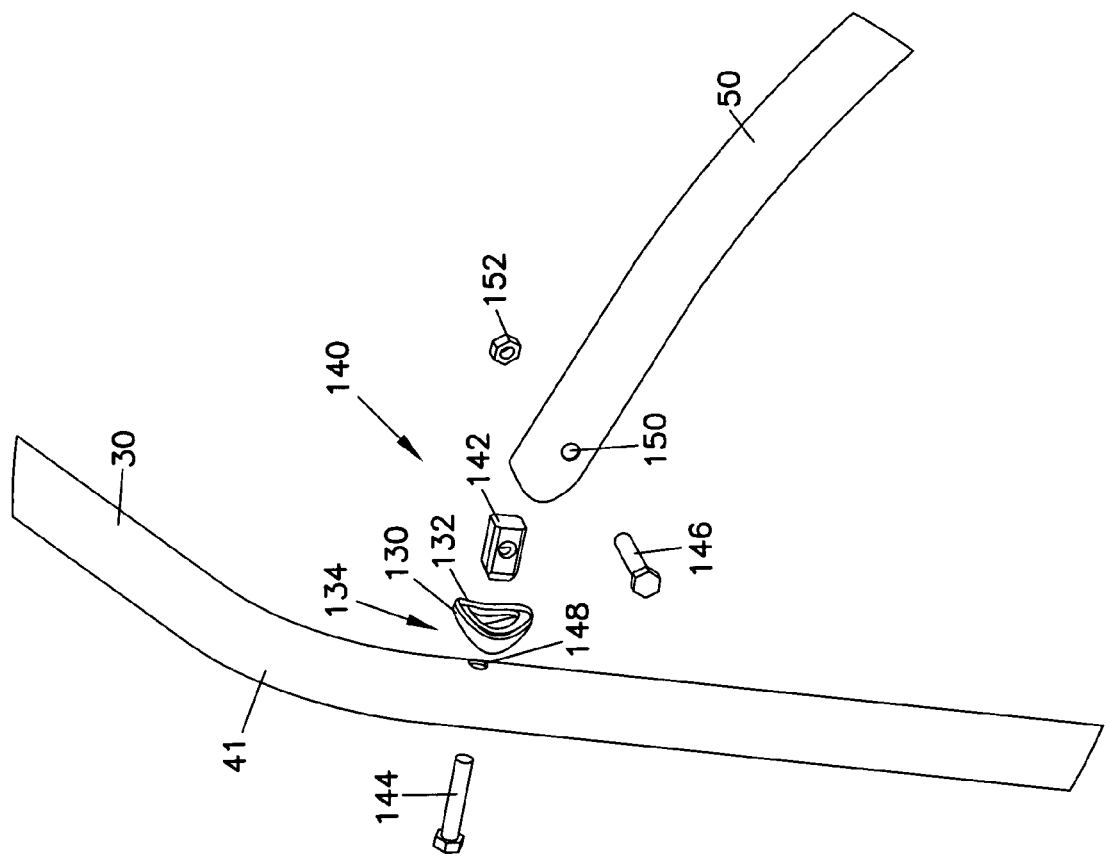
FIG. 5 is a perspective view of an exploded portion of the pickup truck bed frame shown in FIG. 4.

Now referring to FIG. 5, the attachment of the left arm 50 to the frame member 30 is shown. It should be understood that this same type of connection can be used to connect the left bed rail 52 to the left arm 50, the right arm 70 to the frame member 30, and the right bed rail 72 to the right arm 70. By way of illustration, the attachment of the left arm 50 to the frame member 30 is shown in detail. To provide a snug fit between the left arm 50 and the frame member 30, a seat 130 can be provided having a tube receiving end 132 and a tube wrapping end 134. In general, the tube wrapping end 134 is provided with a curve that allows it to wrap around the exterior of the frame member 30. The tube receiving end 132 is provided with a shape that allows it to receive the left arm 50. In general, the seat 130 provides an aesthetically pleasing transition between the left arm 50 and the frame member 30. In addition, the seat 130 can provide a seal against water from entering the left arm 50 and/or the frame member 30. In order to hold the left arm 50 to the frame member 30, a fastener assembly 140 can be provided. The fastener assembly 140 includes an insert 142 that fits within the left arm 50, a main bolt 144 that extends through the frame member 30 and the insert 142. A secondary bolt 146 can be provided extending through the left arm 50 and the insert 142. Accordingly, the frame member 30 can include a main bolt opening 148 for receipt of the main bolt 144, and the frame member 30 can include a secondary bolt opening 150 for receipt of the secondary bolt 146. In addition, a nut 152 can be provided for tightening the secondary bolt 146. The insert 142 can be provided as a nut for tightening the main bolt 144.

Now referring to FIGS. 7–10, exemplary forms of the insert 142 and the seat 130 are shown in detail. The insert 142 includes a secondary bolt passageway 160 and a main bolt passageway 162. The main bolt passageway 162 can include threads 164 that allow it to engage and hold the main bolt 144 in place. The seat 130 includes a tube receiving end 132 having a flange 170 that allows the seat to receive the left arm 50 therein. The seat 130 additionally includes the tube wrapping end 134 that allows the seat 130 to wrap around the exterior of the frame member 30 and provide a desired seal. The seat 130 includes an opening 172 through which the main bolt 144 can pass. It should be understood that alternative techniques for attaching the left arm 50 and the right arm 70 to the frame member 30, the right bed rail 72 to the right arm 70, and the left bed rail 52 to the left arm 50 can be provided.

Now referring to FIG. 11, an alternative contoured member 180 is shown. The contoured member 180 can be similar to the contoured member 28 with the exception that the contoured member 180 includes a plurality of lights 182 and an electrical system 184 that provides for operation of the lights 182. The contoured member 180 can include central member top and bottom edges 186 and 188 that provide surfaces for adhesive tape to hold the contoured member 180 to the frame member 30. It should be understood that the electrical system 184 can be constructed so that the lights 182 operate in a desired manner. For example, the lights can automatically go on when the vehicle's headlights go on. In addition, the lights can go on or become brighter when the operator of the vehicle brakes. In addition, the electrical system can be constructed so that the vehicle operator has the ability to turn the lights on or off, as desired. The electrical system 184 can include wires 189 that pass through the frame member 30 and connect to the vehicle electrical system.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A pickup truck bed frame comprising:
   (a) a frame member comprising a frame member left end constructed for attachment to a pickup truck bed left sidewall, a frame member right end constructed for attachment to a pickup truck bed right sidewall, and a central member constructed to extend across a pickup truck cab from the frame member left end to the frame member right end;
   (b) a left support structure comprising a left support arm having a left support arm first end constructed for attachment to the frame member, and a left support arm second end constructed for attachment to a pickup truck bed left sidewall;
   (c) a right support structure comprising a right support arm having a right support arm first end constructed for attachment to the frame member, and a right support arm second end constructed for attachment to a pickup truck bed right sidewall; and
   (d) a left panel and a right panel, wherein the left panel is constructed for adhering to the frame member and the left support arm, and the right panel is constructed for adhering to the frame member and the right support arm.

2. A pickup truck bed frame according to claim 1, wherein the left support structure further comprises a left bed rail comprising a left bed rail first end constructed for attachment to the left support arm, and a left bed rail second end constructed for attachment to a pickup truck bed left sidewall.

3. A pickup truck bed frame according to claim 1, wherein the right support structure further comprises a right bed rail comprising a right bed rail first end constructed for attachment to the right support arm, and a right bed rail second end constructed for attachment to a pickup truck bed right sidewall.

4. A pickup truck bed frame according to claim 1, further comprising a fastener for attaching the left support arm to the frame member, and a fastener for attaching the right support arm to the frame member.

5. A pickup truck comprising:
   (a) a cab and a bed, wherein the bed comprises a left sidewall and a right sidewall;
   (b) a frame member comprising a frame member left end attached to the left sidewall, a frame member right end attached to the right sidewall, and a frame member central portion extending across the cab from the frame member left end to the frame member right end;
   (c) a left support structure comprising a left support arm having a left support arm first end attached to the frame member, and a left support arm second end attached to the left sidewall;
   (d) a right support structure comprising a right support arm having a right support arm first end attached to the frame member, and a right support arm second end attached to the right sidewall; and
   (e) a left panel and a right panel, the left panel adhered to the frame member and the left support arm, and the right panel adhered to the frame member and the right support arm.

6. A pickup truck according to claim 5, wherein the left support structure further comprises a left bed rail comprising a left bed rail first end attached to the left support arm, and a left bed rail second end attached to the left sidewall.

7. A pickup truck according to claim 5, wherein the right support structure further comprises a right bed rail comprising a right bed rail first end attached to the right support arm, and a right bed rail second end attached to the right sidewall.

8. A pickup truck bed frame comprising:
(a) a frame member comprising a frame member left end constructed for attachment to a pickup truck bed left sidewall, a frame member right end constructed for attachment to a pickup truck bed right sidewall, and a central member constructed to extend across a pickup truck cab from the frame member left end to the frame member right end;
(b) a left support structure comprising a left support arm having a left support arm first end constructed for attachment to the frame member, and a left support arm second end constructed for attachment to a pickup truck bed left sidewall;
(c) a right support structure comprising a right support arm having a right support arm first end constructed for attachment to the frame member, and a right support arm second end constructed for attachment to a pickup truck bed right sidewall; and
(d) a contoured member constructed for adhering to the central member.

9. A pickup truck bed frame according to claim 8, wherein the contoured member comprises lights.

10. A pickup truck bed frame according to claim 9, wherein the lights are constructed to turn on when the pickup truck bed frame is attached to a pickup truck and the pickup truck lights are on.

11. A pickup truck bed frame according to claim 8, wherein the left support structure further comprises a left bed rail comprising a left bed rail first end constructed for attachment to the left support arm, and a left bed rail second end constructed for attachment to a pickup truck bed left sidewall.

12. A pickup truck bed frame according to claim 8, wherein the right support structure further comprises a right bed rail comprising a right bed rail first end constructed for attachment to the right support arm, and a right bed rail second end constructed for attachment to a pickup truck bed right sidewall.

13. A pickup truck bed frame according to claim 8, further comprising a fastener for attaching the left support arm to the frame member, and a fastener for attaching the right support arm to the frame member.

14. A pickup truck comprising:
(a) a cab and a bed, wherein the bed comprises a left sidewall and a right sidewall;
(b) a frame member comprising a frame member left end attached to the left sidewall, a frame member right end attached to the right sidewall, and a frame member central portion extending across the cab from the frame member left end to the frame member right end;
(c) a left support structure comprising a left support arm having a left support arm first end attached to the frame member, and a left support arm second end attached to the left sidewall;
(d) a right support structure comprising a right support arm having a right support arm first end attached to the frame member, and a right support arm second end attached to the right sidewall; and
(e) a contoured member adhered to the frame member central portion.

15. A pickup truck according to claim 14, wherein the contoured member comprises lights.

16. A pickup truck according to claim 14, wherein the left support structure further comprises a left bed rail comprising a left bed rail first end attached to the left support arm, and a left bed rail second end attached to the left sidewall.

17. A pickup truck according to claim 14, wherein the right support structure further comprises a right bed rail comprising a right bed rail first end attached to the right support arm, and a right bed rail second end attached to the right sidewall.

* * * * *